United States Patent
Yang

(10) Patent No.: US 8,524,076 B2
(45) Date of Patent: Sep. 3, 2013

(54) FLUID PURIFICATION UNIT AND FLUID PURIFICATION ASSEMBLY INCLUDING THE SAME

(75) Inventor: Ki-Hae Yang, Jeonju-si (KR)

(73) Assignee: Segi Environment Co., Ltd., Jeonju-Si, Jeollabuk-Do (KR)

(*) Notice: Subject to any disclaimer, the term of this patent is extended or adjusted under 35 U.S.C. 154(b) by 0 days.

(21) Appl. No.: 12/994,993

(22) PCT Filed: Sep. 10, 2010

(86) PCT No.: PCT/KR2010/006184
§ 371 (c)(1),
(2), (4) Date: Nov. 29, 2010

(87) PCT Pub. No.: WO2011/031094
PCT Pub. Date: Mar. 17, 2011

(65) Prior Publication Data
US 2012/0181223 A1 Jul. 19, 2012

(30) Foreign Application Priority Data
Sep. 14, 2009 (KR) .......... 10-2009-0086325

(51) Int. Cl.
C02F 3/10 (2006.01)
B01J 19/32 (2006.01)
A63H 33/08 (2006.01)

(52) U.S. Cl.
CPC ............. C02F 3/101 (2013.01); B01J 19/32 (2013.01); A63H 33/086 (2013.01); *Y10S 261/72* (2013.01)
USPC .... 210/150; 210/541; 210/615; 261/DIG. 72; 428/34.1; 428/36.92; 446/125; 446/126; 446/128

(58) Field of Classification Search
USPC .. 210/150, 151, 541, 615, 617; 261/DIG. 72; 428/34.1, 35.7, 36.92, 131; 446/125, 126, 446/128
See application file for complete search history.

(56) References Cited

U.S. PATENT DOCUMENTS 2,911,204 A * 11/1959 Malone ................. 261/DIG. 72
3,329,271 A * 7/1967 Ward et al. ..................... 210/150
(Continued)

FOREIGN PATENT DOCUMENTS

| JP | 2006-150331 | 6/2006 |
|---|---|---|
| KR | 20-0411483 | 3/2006 |

(Continued)

OTHER PUBLICATIONS

International Search Report of International Application No. PCT/KR2010/006184, dated May 30, 2011.

*Primary Examiner* — Christopher Upton
(74) *Attorney, Agent, or Firm* — Kile Park Reed & Houtteman PLLC

(57) ABSTRACT

A fluid purification unit includes a case including a hollow and a plurality of openings communicating with the hollow to flow a fluid inside into the hollow and outside from the hollow, the case including combining protrusions formed on a first face and concave portions formed on a second face opposite to the first face, each of the combining protrusions having a first cross sectional area and being regularly arranged in a first direction and at a first interval and each of the concave portions having a second area corresponding to the first cross sectional area and being arranged at a second interval corresponding to the first interval.

15 Claims, 5 Drawing Sheets

(56) References Cited

U.S. PATENT DOCUMENTS

| | | | | |
|---|---|---|---|---|
| 3,543,937 A | * | 12/1970 | Choun | 210/150 |
| 3,904,525 A | * | 9/1975 | Rosenberg | 210/150 |
| 4,113,810 A | * | 9/1978 | Ikawa | 261/DIG. 72 |
| 4,382,046 A | * | 5/1983 | Frohwerk | 261/DIG. 72 |
| 5,000,713 A | * | 3/1991 | Cheng | 446/128 |
| 6,241,222 B1 | * | 6/2001 | Lang | 261/DIG. 72 |
| 6,679,780 B1 | * | 1/2004 | Shih | 446/125 |
| 7,156,986 B2 | * | 1/2007 | Warrow | 210/150 |
| 7,303,668 B2 | * | 12/2007 | Liao | 210/150 |
| 7,527,728 B2 | * | 5/2009 | Jackson | 210/150 |
| 2004/0182762 A1 | * | 9/2004 | Sonego | 210/150 |

FOREIGN PATENT DOCUMENTS

| | | |
|---|---|---|
| KR | 10-0570938 | 4/2006 |
| KR | 10-0723295 | 5/2007 |
| KR | 10-0777046 | 11/2007 |
| KR | 10-0793641 | 1/2008 |

\* cited by examiner

FLUID PURIFICATION UNIT AND FLUID PURIFICATION ASSEMBLY INCLUDING THE SAME

CROSS-REFERENCE TO RELATED APPLICATIONS

This application claims priority under 35 USC §119 to Korean Patent Application No. 2009-86325 filed on Sep. 14, 2009, the contents of which are herein incorporated by reference in its entirety.

BACKGROUND OF THE INVENTION

1. Field of the Invention

Example embodiments of the present invention relate to a fluid purification unit for purifying the water and a fluid purification assembly including the fluid purification unit. More particularly, example embodiments of the present invention relate to a fluid purification unit for purifying a fluid by a biological method using a microorganism and a fluid purification assembly including the fluid purification unit.

2. Description of the Related Art

A water treating method and an air purification method have been developed and applied using a microorganism due to environmental issues related a water pollution and an air pollution.

Generally, a biological water treatment method has treated wastewater using the microorganism. Alternatively, a chemical water treatment method has treated wastewater using a chemical agent. The biological water treatment method treats wastewater without the chemical agent to prevent a second pollution due to the chemical agent from occurring. Thus, the biological water treatment method has advantages of purifying wastewater without generating a byproduct harmful to the human to widen various application fields. In the biological water treatment method, it may be very important to develop a media carrying the microorganism to be reacted with wastewater. The biological water treatment method has been mainly applied to treat wastewater or streamwater as well as culturing water for a fishery, an aquarium, etc. The biological water t treatment method may be also adopted to purify water for a water culture farms or a drinking water facilities.

The biological water treatment method can be classified into an aerobic water treatment type and an anaerobic water treatment type. The aerobic water treatment type utilizes oxygen to react the microorganism to wastewater, whereas the anaerobic water treatment type can purify wastewater by reacting the microorganism with the wastewater without oxygen. The aerobic water treatment type has advantages that a reaction time is relatively short, an organic compound can be completely removed from wastewater and a relatively small area is necessary, comparing with the anaerobic water treatment type. In the aerobic water treatment type, the organic compound can provide cell components and energy for a cell synthesis reaction and a metabolism of aerobic bacteria is utilized using free oxygen as an oxidation agent.

SUMMARY OF THE INVENTION

Example embodiments of the present invention provide a fluid purification unit capable of increasing practicality and purification efficiency by changing a size and a shape.

Example embodiments of the present invention provide a fluid purification assembly capable of generating an aerobic reaction and an anaerobic reaction simultaneously to increase purification efficiency.

According to one aspect of the present invention, there is provided a fluid purification unit. The fluid purification unit includes a case including a hollow and a plurality of openings communicating with the hollow to flow a fluid inside into the hollow and outside from the hollow, wherein the case includes combining protrusions formed on a first face and concave portions formed on a second face opposite to the first face, each of the combining protrusions having a first cross sectional area and being regularly arranged in a first direction and at a first interval and each of the concave portions having a second area corresponding to the first cross sectional area and being arranged at a second interval corresponding to the first interval.

In some example embodiments, the concave portions may be defined by a base corresponding to the second face, a first protrusion portion vertically extending along an edge portion of the base from the second face, second protrusion portions vertically protruding from a central portion of the base, the second protrusion portions being arranged at the second interval in the first direction and extending portions extending toward the second protrusion portions from an inner sidewall of the first protrusion portion, the extending portions being arranged at the second interval in the second direction. Here, each of the combining protrusions may have a side wall to make contact with the second protrusion portions and the extension portions adjacent to one another in a plan view. Further, the case may further include first penetration portions formed on the first face and between the combining protrusions adjacent to each other. The case may further include a recess portion formed on a central portion of each of the second protrusion portions to receive the fluid. And the case may further include second penetration portions formed on the second face and between the extending portions and the second protrusion portions adjacent to one another.

In an example embodiment, each of the combining protrusions may have a vertical height substantially identical to those of the first and the second protrusion portions.

In an example embodiment, the case may further include a third penetration portion formed on a central portion of each of the combining protrusions to communicate with the hollow.

In an example embodiment, each of the openings may have a size substantially identical to the first cross sectional area such that the combining protrusions are combined to the openings, respectively.

In an example embodiment, the fluid purification unit may further include a biofilm in the case to purify the fluid which flows through the openings.

According to one aspect of the present invention, there is provided a fluid purification assembly. The fluid purification assembly includes a first fluid purification unit including a case including a hollow and a plurality of openings communicating with the hollow to flow a fluid inside into the hollow and outside from the hollow, wherein the case includes first combining protrusions formed on a first face and first concave portions formed on a second face opposite to the first face, each of the first combining protrusions having a first cross sectional area and being regularly arranged in a first direction and at a first interval and each of the first concave portions having a second area corresponding to the first cross sectional area and being arranged at a second interval corresponding to the first interval and a second fluid purification unit including second combining protrusions combined with the first concave portions, the second fluid purification unit having a structure substantially identical of that of the first fluid purification unit. Here, first the concave portions may be defined by a base corresponding to the second face, a first protrusion portion vertically extending along an edge portion of the base from the second face, second protrusion portions vertically protruding from a central portion of the base, the second protrusion portions being arranged at the second interval in the first direction and extending portions extending toward the second protrusion portions from an inner sidewall of the first protrusion portion, the extending portions being arranged at the second interval in the second direction, and each of the first combining protrusions having a side wall to make contact with the second protrusion portions and the extension portions adjacent to one another in a plan view, and an aerobic reaction occurring in the hollow and an anaerobic reaction in a space defined by the first combining protrusions and the second concave portions.

In an example embodiment, the case of the first fluid purification unit may further include second penetration portions formed on the second face and between the extending portion and the second protrusion portions adjacent to one another. Further, the case of the first fluid purification unit may further include a recess portion formed on a central portion of each of the second protrusion portions, configured to receive the fluid. In addition, the case of the first fluid purification unit may further include first penetration portions formed on the first face and between the first combining protrusions adjacent to one another.

In an example embodiment, each of the first and the second fluid purification units further includes a biofilm in the case to purify the fluid through the openings.

According to example embodiments of the fluid purification unit, a case can be provided easily and swiftly with various sizes and shapes in accordance with a capacity and characteristics of a treating reservoir to increase practicality and purification efficiency in an economical view. Further, while aerobic biological purification reaction may occur in a hollow of the case, the anaerobic biological reaction may be induced in a combining space located between two cases. Thus, the fluid purification assembly may have increased purification efficiency.

BRIEF DESCRIPTION OF THE DRAWINGS

The above and other features and advantages of the present invention will become more apparent by describing in detailed exemplary embodiments thereof with reference to the accompanying drawings, in which.

DESCRIPTION OF THE EMBODIMENTS

Figure 1:
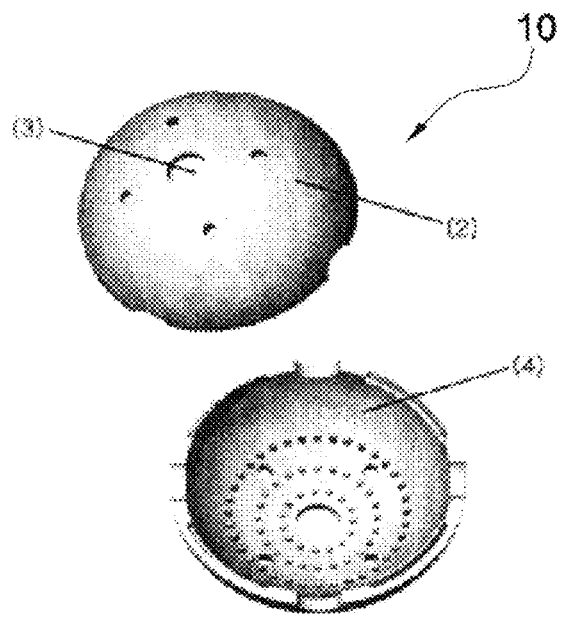
FIG. 1 is a perspective view illustrating a fluid purification unit in accordance with an example embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view illustrating a fluid purification unit in accordance with an example embodiment of the present invention.

Referring to FIG. 1, a fluid purification unit in accordance with an example embodiment of the present invention includes a case 10 and a titanium thin film 2. The case 10 may have a ball shape. The case 10 may be formed with a mixture of titanium and zeolite. The case 10 includes a hollow 4 in which a bio film is positioned and a plurality of openings 3 through which a fluid flows. A microorganism may be attached to and proliferated with the bio film. The fluid and the microorganism are reacted with each other to purify the fluid. The titanium thin film 2 is formed on an external face of the ball.

The fluid purification unit may have a case with various sizes and shapes in accordance with application fields. For example, the case has a relatively small size for a small scaled purification system, whereas the case has a relatively large size for a large scaled purification system.

Further, the case may have a ball shape considering the fluid flow. In other hand, the case may have a random and asymmetric shape in accordance with characteristics of fluid flow.

Figure 2:
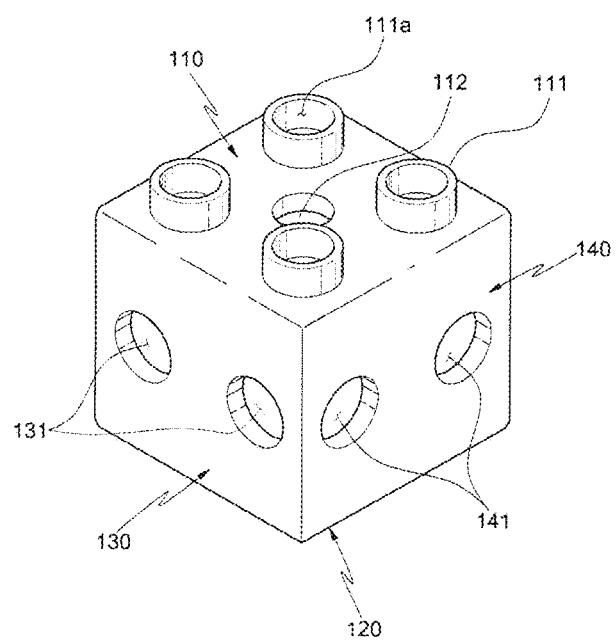
FIG. 2 is a perspective view illustrating a case in accordance with an example embodiment of the present invention.
Figure 3:
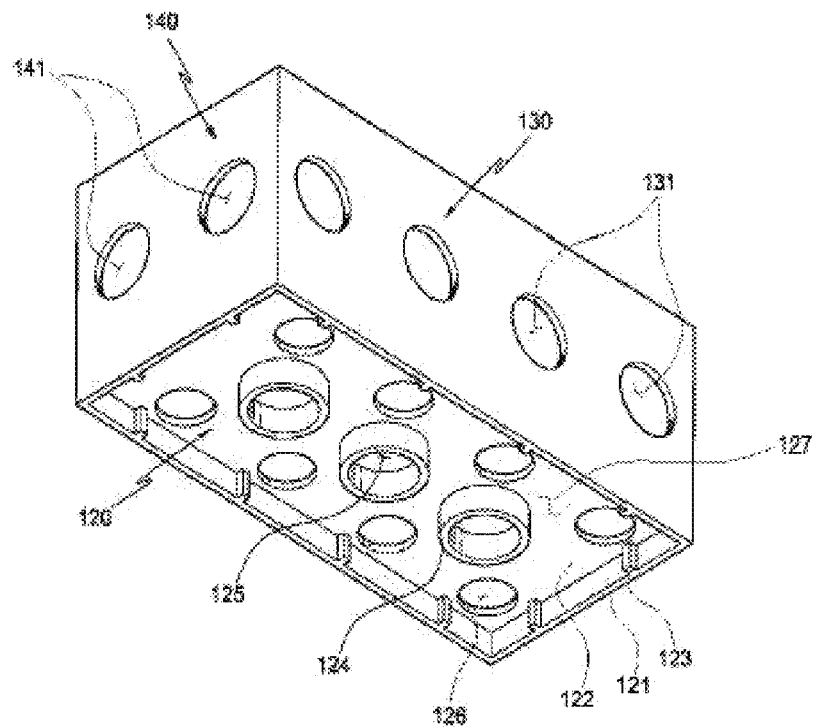
FIG. 3 is a perspective view of a second face of the case in FIG. 2.

FIG. 2 is a perspective view illustrating a case in accordance with an example embodiment of the present invention. FIG. 3 is a perspective view of a second face of the case in FIG. 2.

Figure 6:
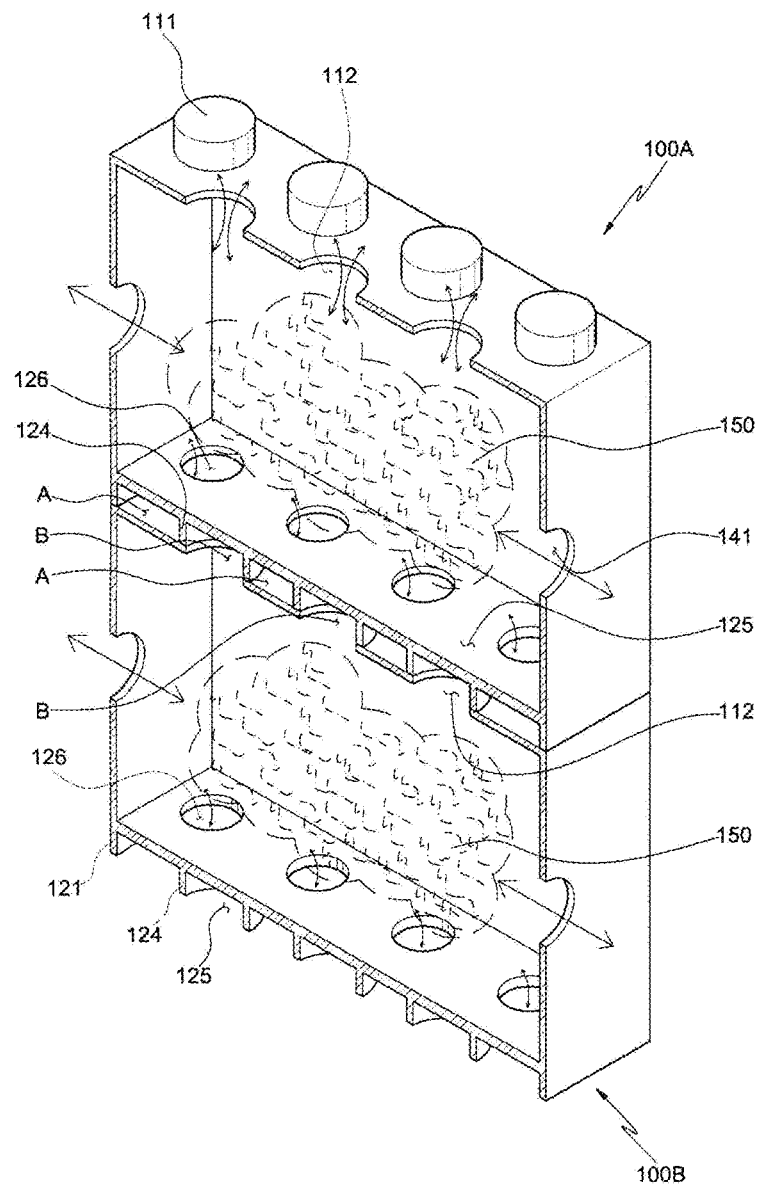
FIG. 6 is a partially exploded perspective view of the fluid purification assembly in FIG. 5.

Referring to FIGS. 2 and 3, a fluid purification unit in accordance with an example embodiment of the present invention includes a case 100 and a biofilm 150 (See FIG. 6).

The case 100 has a hollow and a plurality of openings 131 and 141. The hollow is formed in the case 100. The openings 131 and 141 are formed through the case to communicate the hollow with the outside of the case 100.

The biofilm 150 is formed in the case 100. The biofilm 150 purifies a fluid which flows through the openings 131 and 141 into the case 100.

In some example embodiments, the case 100 includes a plurality of faces 110, 120, 130 and 140. For example, the case 100 may have four faces to have a cubic shape as shown in FIG. 2 or a rectangular shape as shown in FIG. 3. Further, the case 100 may have a various shapes such as a polyhedron shape having a plurality of faces.

In some example embodiments of the present invention, the case 100 may have a hemispherical shape, a spherical shape, a cylindrical shape, a conical shape, etc.

The biofilm 150 may be carried in various types of carriers. For example, one carrier includes a micro fiber such that the carrier may carry the biofilm 150 to be positioned in the case 100. On the other hand, another carrier includes a carbon fiber such that the carrier may carry the biofilm 150 to be positioned in the case 100.

In an example embodiment of the present invention, the case 100 includes a plurality of combining protrusions 111 formed on a first face 110, a plurality of concave portions 127 formed on a second face 120 and a plurality of faces 130 and 140 through which a plurality of openings 131 and 141 are formed. The fluid may flow through the openings 131 and 141.

Each of the combining protrusions 111 may have a uniform cross-sectional area. The combining protrusions 111 may be regularly arranged in a first direction at a first interval. The concave portions 127 may be regularly arranged in the first direction at a second interval substantially identical to the first interval. Thus, the combining protrusions 111 of one case may be combined with the concave portions included in another case.

The concave portions 127 may be defined by a base 122, a first protrusion portion 121, second protrusion portions 124 and extension portions 123.

The base 122 corresponds to the second face 120. The first protrusion portion 121 is formed along an edge portion of the second face 120. In other words, the first protrusion portion 121 is formed along an edge portion of the base 122. The first protrusion portion 121 may protrude from the edge portion of the base 122 in a vertical direction.

The second protrusion portions 124 protrude from a central portion of the base 122 in the vertical direction. Each of the second protrusion portions 124 may have a disc shape. The second protrusion portions 124 are arranged in the first direction at the second interval substantially identical to the first interval. Each of the second protrusion portions 124 may have a height substantially identical to a height of the first protrusion portion 121 vertically measured from a surface of the base 122.

The extension portions 123 extend vertically from an inner side face of the first protrusion portion 121 toward the second protrusion portions 124. The extension portions 123 may be arranged in the first direction at the second interval.

Each of the combining protrusions 111 may have a side wall to make contact with the second protrusion portions 124 and the extension portions 123 adjacent to one another in a plan view. Thus, the concave portions 127 may be defined by the second protrusion portions 124 and the extension portions 123 adjacent to one another. As a result, the combining protrusion 111 of one case may be connected to one of the concave portions 127 of another case to combine two cases with each other.

In one example embodiment, each of the second protrusion portions 124 may have a recess portion 125. The recess portion 125 may temporally store the fluid. In another example embodiment, each of the second protrusion portions 124 may have a penetration portion to communicate with the hollow of the case 110.

Each of the faces 130 and 140 may have openings 131 and 141, respectively, to serve as passage to flow the fluid into the case and from the case.

In some example embodiments, each of the openings 131 and 141 may have a size substantially identical to a cross-section area of the combining protrusion 111 such that the combining protrusion 111 of one case may be combined to the openings 131 and 141 to connect two cases with each other.

In some example embodiments, a first penetration portion 112 may be formed through the first face 110. The first penetration portion 112 may be formed between the combining protrusions 111 adjacent to each other to prevent the combining protrusions 111 from intervening with the first penetration portion 112. Thus, the fluid can flow through the first penetration portion 112 into the case to make contact with the microorganism in the bio film 150.

In some example embodiments, a third penetration portion 111a may be formed through at a central portion of the combining protrusion 111 to communicate with the hollow of the case 110. Thus, the fluid can flow through the third penetration portion 111a into the case to activate contact between the fluid and the microorganism attached to the bio film 150.

Referring to FIG. 3, a second penetration portion 126 may be formed through the base 122 of the second face 120 to communicate with the hollow. The second penetration portion 126 may be formed between the extension portions 123 and the second protrusion portions 124 adjacent to one another. When a plurality of cases is combined to each other to form a purification assembly, the second penetration portion 126 may be effective to purify the fluid.

Figure 4:
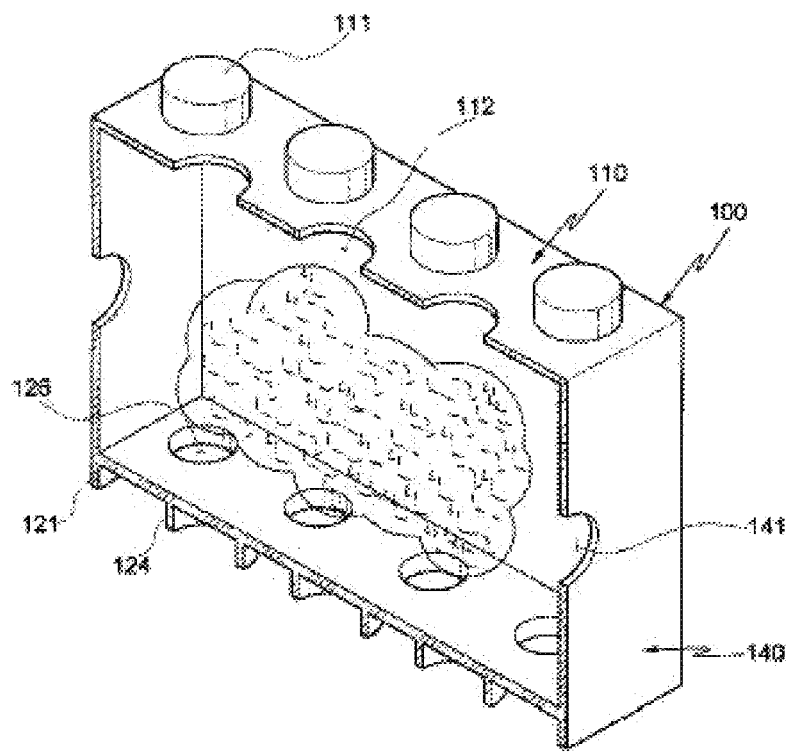
FIG. 4 is a partially exploded perspective view illustrating the case in FIG. 2.

FIG. 4 is a partially exploded perspective view illustrating the case in FIG. 2.

Referring to FIG. 4, the bio film 150 is formed in the case 100. The case 110 includes a plurality of openings formed through the first face, the second face and side faces such that the fluid flows inwardly or outwardly through the openings to purify the fluid while an aerobic biological purification reaction occurs.

Figure 5:
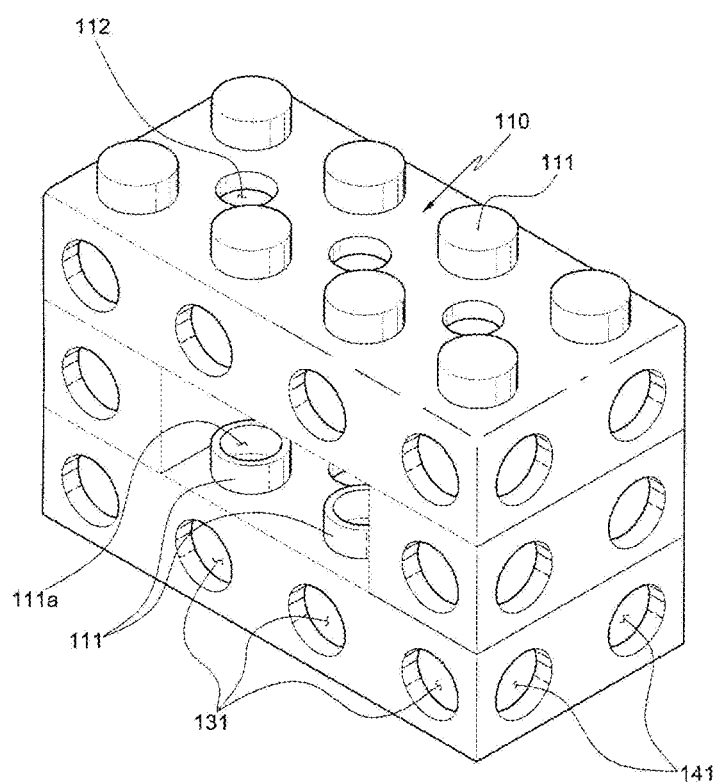
FIG. 5 is a perspective view illustrating a fluid purification assembly in accordance with an example embodiment of the present invention.

The fluid purification unit in accordance with some example embodiments may sufficiently purify the fluid as an independent unit. On the other hand, a plurality of fluid purification units is combined with each other to form a fluid purification assembly such that the fluid purification assembly may achieve to have a powerful effect to purify the fluid FIG. 5 is a perspective view illustrating a fluid purification assembly in accordance with an example embodiment of the present invention. FIG. 6 is a partially exploded perspective view of the fluid purification assembly in FIG. 5.

Referring to FIGS. 5 and 6, each of an upper case 100A and a lower case 100B receives a biofilm 150 therein. Arrows indicate directions of inflow and outflow of fluid when the fluid flows through openings formed through an upper face, a lower face and a side face of each of the upper case 100A and the lower case 100B.

In case that the upper case 100A is combined with the lower case 100B, spaces A and B are defined between the upper and the lower cases 100A and 100B. The fluid may restrictedly flow into the spaces A and B such that air may not be smoothly provided into the spaces A and B to generate an anaerobic reaction between the fluid and the microorganism.

In some example embodiments, the space A is defined by the first protrusion portion 121 of the upper case 100A, the base 122 of the upper case 100A and the first face 110 of the lower case 100B located between the first face 110 of the lower case 100B and the second face 120 of the upper case 100A. The fluid may not flow smoothly in the space A. When the fluid flows into the space A through the second penetration portion 126 formed on the base 122 of the upper case 100A, the inflow amount into the space A may be relatively small because the combining protrusion 111 of the lower case 100B may disturb a flow of the fluid. Further, the fluid may not flow smoothly in the space A because a plurality of the second protrusion portions 124 and the extension portion 123 may disturb the flow of the fluid in the space A. Thus, the anaerobic reaction may naturally generate in the space A.

In some example embodiments, the space B is defined by a recess portion 125 formed at a central portion of the second protrusion portion 124. When the fluid flows into the space B through the first penetration portion 112 formed on the lower case 100B, overall flow of the fluid may have little effects on the flow in the space B. Thus, the anaerobic reaction may naturally generate also in the space B.

The spaces A and B are partially enclosed as illustrated with reference to FIGS. 5 and 6. On the other hand, the spaces A and B may be completely enclosed.

According to some example embodiments, the combining protrusion and the concave portions may be combined with each other to form a fluid purification assembly such that the anaerobic reaction may generate without oxide to produce a combustible methane gas and the aerobic biological purification reaction may also generate to compensate disadvantages that a reaction time may be relatively long and an odor may occur during the anaerobic reaction. Thus, the fluid purification assembly may purify the fluid while both the anaerobic reaction and the aerobic reaction occur.

Figure 7:
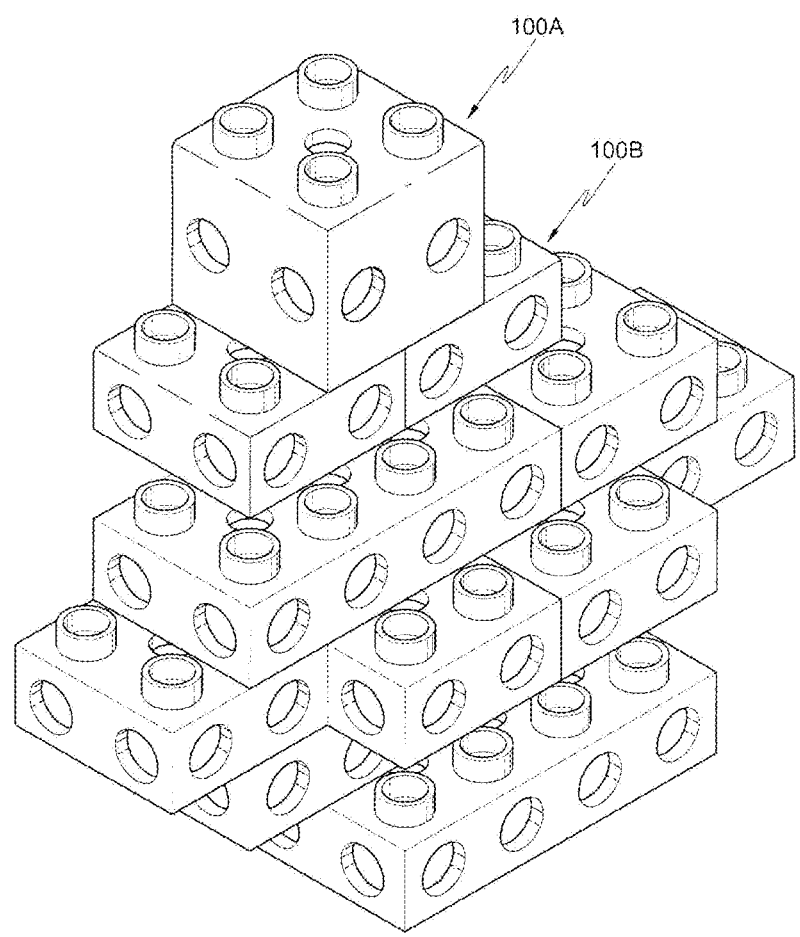
FIG. 7 is a perspective view illustrating a fluid purification assembly in accordance with an example embodiment of the present invention.

FIG. 7 is a perspective view illustrating a fluid purification assembly in accordance with an example embodiment of the present invention.

Referring to FIG. 7, a fluid purification assembly in accordance with an example embodiment of the present invention may have a random shape to cope with a variable flow direction of the fluid such that the flowability of the fluid may be improved comparing with a fluid purification assembly including a plurality of fluid purification units regularly combined with each other. Thus, the fluid purification assembly may have increased purification efficiency by the anaerobic reaction.

According to example embodiments of the present invention, a biofilm may be carried in various types of carriers. For example, the biofilm may be carried by a micro fiber such that the biofilm may be received in a case. On the other hand, the biofilm may be carried by a carbon fiber such that the biofilm may be received in a case. Further, the fluid purification unit may be applied to treat a wastewater or a streamwater as well as culturing water for a fishery, an aquarium, etc. The purification unit may be also adopted to purify water for a water culture farm or a drinking water facility. Furthermore, the fluid purification unit may be used for an air purification apparatus.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of the present invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A fluid purification unit comprising:
   a case including a hollow and a plurality of openings communicating with the hollow to flow a fluid inside into the hollow and outside from the hollow;
   wherein the case includes combining protrusions formed on a first face and concave portions formed on a second face opposite to the first face, each of the combining protrusions having a first cross sectional area and being regularly arranged in a first direction and at a first interval and each of the concave portions having a second area corresponding to the first cross sectional area and being arranged at a second interval corresponding to the first interval, wherein the concave portions are defined by;

a base corresponding to the second face;

a first protrusion portion vertically extending along an edge portion of the base from the second face;

second protrusion portions vertically protruding from a central portion of the base, the second protrusion portions being arranged at the second interval in the first direction; and extending portions extending toward the second protrusion portions from an inner sidewall of the first protrusion portion, the extending portions being arranged at the second interval in the second direction.

2. The fluid purification unit of claim 1, wherein each of the combining protrusions has a side wall to make contact with the second protrusion portions and the extension portions adjacent to one another in a plan view.

3. The fluid purification unit of claim 1, wherein some of the openings correspond to first penetration portions formed on the first face and between the combining protrusions adjacent to each other.

4. The fluid purification unit of claim 1, wherein the case further includes a recess portion formed on a central portion of each of the second protrusion portions to receive the fluid.

5. The fluid purification unit of claim 1, wherein some of the openings correspond to second penetration portions formed on the second face and between the extending portions and the second protrusion portions adjacent to one another.

6. The fluid purification unit of claim 1, wherein each of the combining protrusions has a vertical height substantially identical to those of the first and the second protrusion portions.

7. The fluid purification unit of claim 1, wherein at least one of the openings corresponds to a third penetration portion formed on a central portion of each of the combining protrusions to communicate with the hollow.

8. The fluid purification unit of claim 1, wherein each of the openings has a size substantially identical to the first cross sectional area such that the combining protrusions are combined to the openings, respectively.

9. The fluid purification unit of claim 1, further comprising a biofilm in the case to purify the fluid which flows through the openings.

10. A fluid purification assembly comprising:

a first fluid purification unit including a case including a hollow and a plurality of openings communicating with the hollow to flow a fluid inside into the hollow and outside from the hollow, wherein the case includes first combining protrusions formed on a first face and first concave portions formed on a second face opposite to the first face, each of the first combining protrusions having a first cross sectional area and being regularly arranged in a first direction and at a first interval and each of the first concave portions having a second area corresponding to the first cross sectional area and being arranged at a second interval corresponding to the first interval; and a second fluid purification unit including second combining protrusions combined with the first concave portions, the second fluid purification unit having a structure substantially identical of that of the first fluid purification unit, wherein the first concave portions are defined by;

a base corresponding to the second face;

a first protrusion portion vertically extending along an edge portion of the base from the second face;

second protrusion portions vertically protruding from a central portion of the base, the second protrusion portions being arranged at the second interval in the first direction; and extending portions extending toward the second protrusion portions from an inner sidewall of the first protrusion portion, the extending portions being arranged at the second interval in the second direction.

11. The fluid purification assembly of claim 10, wherein each of the first combining protrusions has a side wall to make contact with the second protrusion portions and the extension portions adjacent to one another in a plan view, and an aerobic reaction occur in the hollow and an anaerobic reaction in a space defined by the first combining protrusions and the second concave portions.

12. The fluid purification assembly of claim 11, wherein some of the openings correspond to first penetration portions formed on the first face and between the first combining protrusions adjacent to one another.

13. The fluid purification assembly of claim 11, wherein the case of the first fluid purification unit further includes a recess portion formed on a central portion of each of the second protrusion portions, configured to receive the fluid.

14. The fluid purification assembly of claim 11, wherein some of the openings correspond to second penetration portions formed on the second face and between the first combining protrusions adjacent to one another.

15. The fluid purification assembly of claim 10, wherein each of the first and the second fluid purification units further includes a biofilm in the case to purify the fluid through the openings.

* * * * *